United States Patent [19]

Downs et al.

[11] Patent Number: 4,870,400

[45] Date of Patent: Sep. 26, 1989

[54] ELECTRONIC DOOR LOCK KEY RE-SEQUENCING FUNCTION

[75] Inventors: Stephen R. Downs, Matthews; Charles E. Anderson, Mint Hill, both of N.C.

[73] Assignee: Yale Security Inc., Monroe, N.C.

[21] Appl. No.: 148,723

[22] Filed: Jan. 26, 1988

[51] Int. Cl.[4] .......................... G06K 7/00; H04Q 3/02

[52] U.S. Cl. ...................... 340/825.310; 340/825.340; 235/382; 235/382.500; 361/172

[58] Field of Search ...................... 340/825.31, 825.34, 340/825.3, 825.32, 825.33; 235/382, 382.5, 380, 439, 449, 435, 451; 70/278, 277, 276; 361/172

[56] References Cited

U.S. PATENT DOCUMENTS

| | | | |
|---|---|---|---|
| 3,800,286 | 3/1974 | Zucker et al. | 340/825.31 |
| 3,906,447 | 9/1975 | Crafton | 340/825.31 |
| 4,385,231 | 5/1983 | Mizutani et al. | 340/825.31 |
| 4,396,914 | 8/1983 | Aston | 340/825.31 |
| 4,646,080 | 2/1987 | Genest et al. | 70/278 |

FOREIGN PATENT DOCUMENTS

| | | | |
|---|---|---|---|
| 0169150 | 1/1986 | European Pat. Off. | 70/278 |

*Primary Examiner*—Donald J. Yusko
*Assistant Examiner*—E. O. Pudpud, Sr.
*Attorney, Agent, or Firm*—Sughrue, Mion, Zinn, MacPeak & Seas

[57] ABSTRACT

An electronic security device has at least one lock and a control center for generating keys to the lock. When a new key is generated, a new (second) combination is generated by applying a predetermined algorithm and randomly generated (first) calculation data to the previous (first) combination. To calculate a next new (third) combination, another randomly generated (second) calculation data is applied to the second combination using the same algorithm. The control center stores, on the key, the third combination, and the second calculation data used to obtain it and the first calculation data used to obtain the second combination. At the lock, the third combination is compared with a stored combination and if there is no match, the lock calculates a possible second combination by applying an algorithm, which is the inverse of the predetermined algorithm, to the stored combination using the second calculation data read from the key. If there is still no match, the lock calculates a possible first combination using the first calculation data read from the key. If there is still no match, the lock will not be opened. In another embodiment of the invention, a check-in time and a check-out time are provided on the key, and the lock will not open unless the time is between the check-in and check-out time when the key is inserted.

41 Claims, 4 Drawing Sheets

FIG. 4A
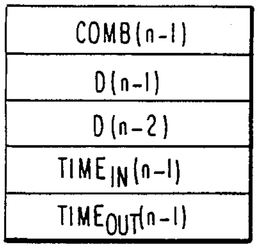
FIG. 4B
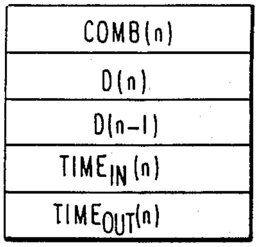
FIG. 4C
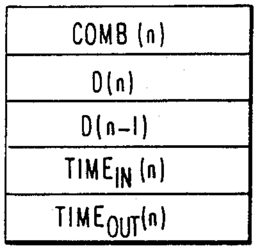
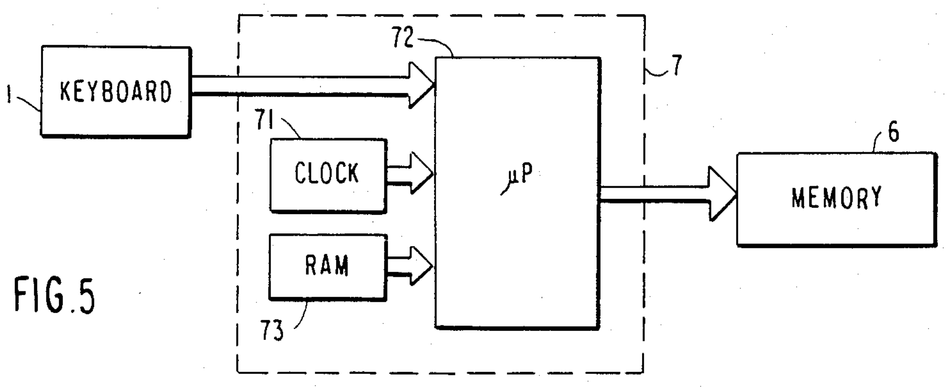
FIG. 5
FIG. 5A
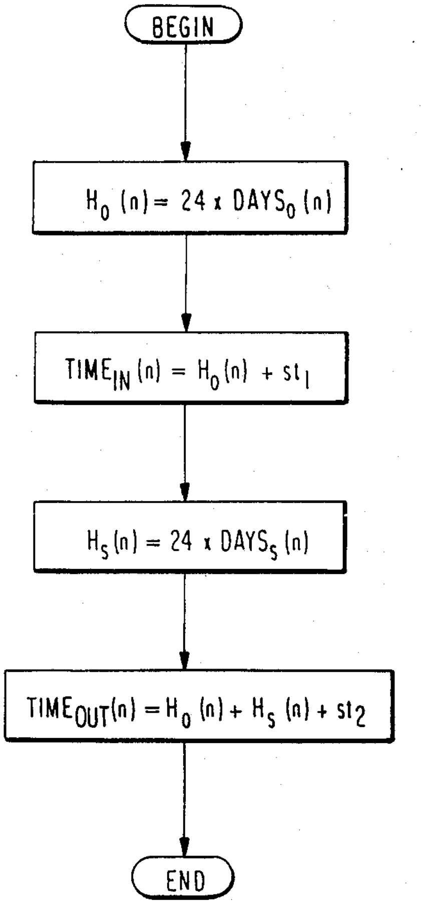

ELECTRONIC DOOR LOCK KEY RE-SEQUENCING FUNCTION

BACKGROUND OF THE INVENTION

This invention relates to an electronic security system for use, for example, to control door locks.

Various forms of electronic security systems are already known, in which a combination stored on a key card (key) is recognized by an electronic circuit to unlock a security device. In many applications of the security device, for example, as a hotel room door lock, it is desirable regularly to change the combination to which the electronic circuit will respond. To ensure that the combination in the lock circuitry and that on the key currently in use match one another, i.e., that the circuit will respond to the combination on the key, each electronic circuit can be connected to a common control center. However, such connections require extensive wiring, which is especially difficult to effect when converting the locks of an existing system to electronic locks.

To achieve the ability to reprogram a lock combination yet avoid wiring, several solutions have been suggested. In describing these systems, the following terminology will be used. "Current user" refers to the holder of a key which has been used in the lock and has stored thereon the same combination as stored in the lock. "Next user" refers to a holder of a key which is next in sequence after the key held by the current user, but the next user's key has not yet been used in the lock, "New next user" refers to the holder of a key which is next in sequence to the key held by the next user. The current user's key can be referred to as the "current key", and the combination stored thereon can be referred to as the "current combination." The adjectives "next" and "new next" can also be used in this way.

The terms "first," "second" and "third" will be used to describe any three successive users, their respective keys and combinations on the keys. For example, where the first user is a current user, "first," "second" and "third" can be used in place of "current," "next" and "new next," respectively.

One suggested solution is to store a fixed sequence of combinations in the circuit and to use each next key to call up the next combination in the sequence. Another suggestion utilizes keys, each of which has two combinations on it, namely the current combination and the next combination. The next combination is stored in the lock in addition to the current combination. When the new next key is used, the next combination is replaced by a new next combination, and the next combination replaces the current combination.

None of the previously suggested systems provides the ideal solution to the problem. At any given time the next combination is already established and this reduces security.

For example, in the system taught by U.S. Pat. No. 3,800,284 (the Zucker et al system), there is a first function generator at the lock and a second function generator at a control center at which keys for the lock are made. The first and second function generators produce numbers in the same predetermined number sequence. When a next user arrives at the control center, the next combination is generated by using a predetermined algorithm to combine the current combination with a first number in the predetermined sequence. The next combination is then stored on a key. Meanwhile, the function generator at the lock has also generated the same first number in the sequence and has applied it to the current combination using the same algorithm to generate the same next combination. Both the current and next combinations are stored in the lock. When the next user inserts the key into the lock, the lock compares the combination on the key with the current combination stored in the lock. If the two match, the lock is opened. If the two do not match, the lock then compares the combination on the key with the next combination stored in the lock. If these two combinations match, the next combination replaces the current combination, and a new next combination is generated and replaces the next combination.

In part to avoid the use of a predetermined sequence, the system set forth in U.S. Pat. No. 4,396,914 (the Aston system) was developed. In this system, the next user's key has randomly generated calculation data and a next combination stored thereon, The next combination is calculated by applying the calculation data or code to the current combination. When the next key is inserted in the lock, the current combination will not match the combination on the key. The lock will thus apply the calculation code, using the same algorithm to the current combination and will compare that result with the next combination. If there is a match, the next combination is stored in the lock in place of the current combination, and the lock will open. When a new next user arrives at the control center and obtains a key, a new calculation code is randomly generated and stored on the key along with a new next combination generated by applying the new calculation code to the next combination. When the new next key is inserted in the lock, the system works the same way as described above.

However, in the Aston system as well as other wireless systems, operation can be adversely affected due to mis-operation of the key maker, non-use of a key or the like. For example, assuming the current key is the first key, if the second key is never inserted in the lock (i.e. if the second key is "skipped"), the third key will not open the lock. This defect, though rare, can be a source of annoyance to a hotel guest who receives the "third key", only to find it does not open the door to his assigned room. The reason this defect occurs can be easily understood from the following.

The lock currently stores the first combination even though the first guest has checked out. When the second guest checks in he is given a key with a randomly generated calculation code (second code) and a second combination. The second combination was generated from the first combination and the second random number (calculation code) in accordance with a fixed algorithm, e.g., an exclusive OR operation or the like. If the second key is used in the lock, it will not only open the door, but will also replace the first combination stored in the lock with the second combination. It will be recalled that the first combination from the lock and the second random code from the key are operated on by the fixed algorithm to generate a second combination, which is then compared with the second combination on the key. This sequence will continue with each guest and each new key.

However, let us assume that the second guest never uses the second key. The reasons may vary, such as a lost key, or the guest has to leave the hotel before ever entering the room. The third guest checks in and receives a third key having a third combination and a third random code. It will be noted that the third combination will have been generated from the second combination and the third random code by using the fixed algorithm. When the third key is inserted in the lock, which is still storing the first combination, the key will be ineffective. The first comparison will be between the third combination from the key and the first combination as stored in the lock. They will not provide the requisite match to open the lock. Next, the third random code, taken from the key and the first combination, taken from the lock, will be operated on by the fixed algorithm to generate a combination, which will neither be the first nor the second combination. This additional combination will also not match the third combination.

Skipping the second key causes quite an inconvenience to the third user who will try the key in the lock and it will fail. The third user will then have to return to the control center, have the operator try to figure out what went wrong, and perhaps reissue the second key. In that case, the third user must use the second key to synchronize the lock, and then use the third key. If this procedure does not work or is not followed the lock memory must be reprogrammed to store the second or third, combination.

SUMMARY OF THE INVENTION

It is an object of the invention to overcome the above-described problems arising in electronic security systems.

It is another object of the invention to achieve a wireless security system in which an electronic lock will open in response to a new next key even if the next key in the sequence has not been inserted in the lock.

It is a further object of the invention to achieve a security system in which the above objects are accomplished yet security is maintained, and the security device is not unduly complex.

These and other objects of the invention are achieved by adding a pair of random numbers or calculation codes to each key and, in effect, running the algorithm in a reverse direction rather than a forward direction. Rather than operating on a calculation code (from the key) and a stored combination (from the lock) to generate the next combination for comparison with the next combination (on the key): the system will operate on the calculation code (on the key) and the next combination (on the key) to generate a previous (i.e., current) combination for comparison with the current combination stored in the lock. If that fails to produce a match the additional calculation code, which is the one prior to the first one mentioned, will combine with the just generated combination to generate a prior combination for comparison with the stored combination.

The algorithm may be any algorithm for which there is an inverse algorithm having the property that when the algorithm is performed on A and B, if C is the result, then when the inverse algorithm is performed on B and C, A is the result. Thus, if a fixed algorithm is used at a lobby desk (control center) to generate each successive combination, the inverse algorithm to the fixed algorithm is used at the lock to determine the successive combinations in reverse order.

In the preferred embodiment of the invention, the algorithm is reversible in the sense that if a second calculation $code_2$, and a first combination are operated on to generate a second $combination_2$, the same algorithm, when applied to the calculation code and the second $combination_2$ will generate the first $combination_1$. An exclusive-OR operation is an example of a reversible algorithm.

Thus in the example given above where the second guest never uses the key the operation will occur as follows. When the third guest arrives, the front desk system will be storing the second combination and the second calculation $code_2$ for the room to be assigned to the guest. The front desk system randomly generates a new number, which becomes the third calculation $code_3$. This third calculation $code_3$ and the second combination are operated upon by the reversible algorithm to generate a third $combination_3$. A key is created having thereon in punched form or magnetic strip, or any other machine readable form adapted to be read at the lock, the third $combination_3$, the third calculation $code_3$, and the second calculation $code_2$.

At the lock the key is inserted in a slot of a key reader for reading the information stored on the key. The third $combination_3$ from the key is read and compared with the first $combination_1$ stored in the lock. There is no match and the lock will not release. The third calculation $code_3$ is read from the key and combined with the third $combination_3$ previously read from the key to generate a combination which is the second $combination_2$. This latter combination is compared with the stored first $combination_1$. There is no match and the lock does not release. The second calculation $code_2$ is read from the key and combined with the just generated second $combination_2$, resulting in the generation of a combination which is the first $combination_1$. This is compared with the stored first $combination_1$, a match is achieved, the lock releases and the third $combination_3$ from the key enters the lock storage replacing the first combination.

In accordance with another aspect of the invention, an expiration time, at which a particular key is no longer valid for opening a lock is encoded onto the key, and the lock is provided with a clock. When the key is inserted in the lock, if the time on the key is less than the time in the clock, the key will not be able to open the lock regardless of the combinations stored on the key and in the lock. The key can also be provided with a check-in time, prior to which the key will not be valid.

BRIEF DESCRIPTION OF THE DRAWINGS

A better understanding of the present invention and the above-mentioned objects, features and advantages as well as additional objects, features and advantages of the invention will be achieved with reference to the detailed description below, and the drawings, in which:

FIG. 4A is a schematic diagram of the contents at a time prior to issuance of a key of a portion of the memory shown in FIG. 2 which is allocated to the security device of FIG. 3;

FIG. 4B is a schematic diagram of the contents at a time after issuance of a key of the portion of the memory shown in FIG. 4A;

FIG. 4C is a schematic diagram of a key for the security device of FIG. 3 produced by the control center of FIG. 2;

FIG. 5 is a schematic circuit diagram of a circuit forming a part of the control center shown in FIG. 2 according to the invention;

FIG. 5A is a flow chart showing the sequence of logical operations performed by the circuit shown in FIG. 5;

DETAILED DESCRIPTION OF THE PREFERRED EMBODIMENTS

Figure 1:
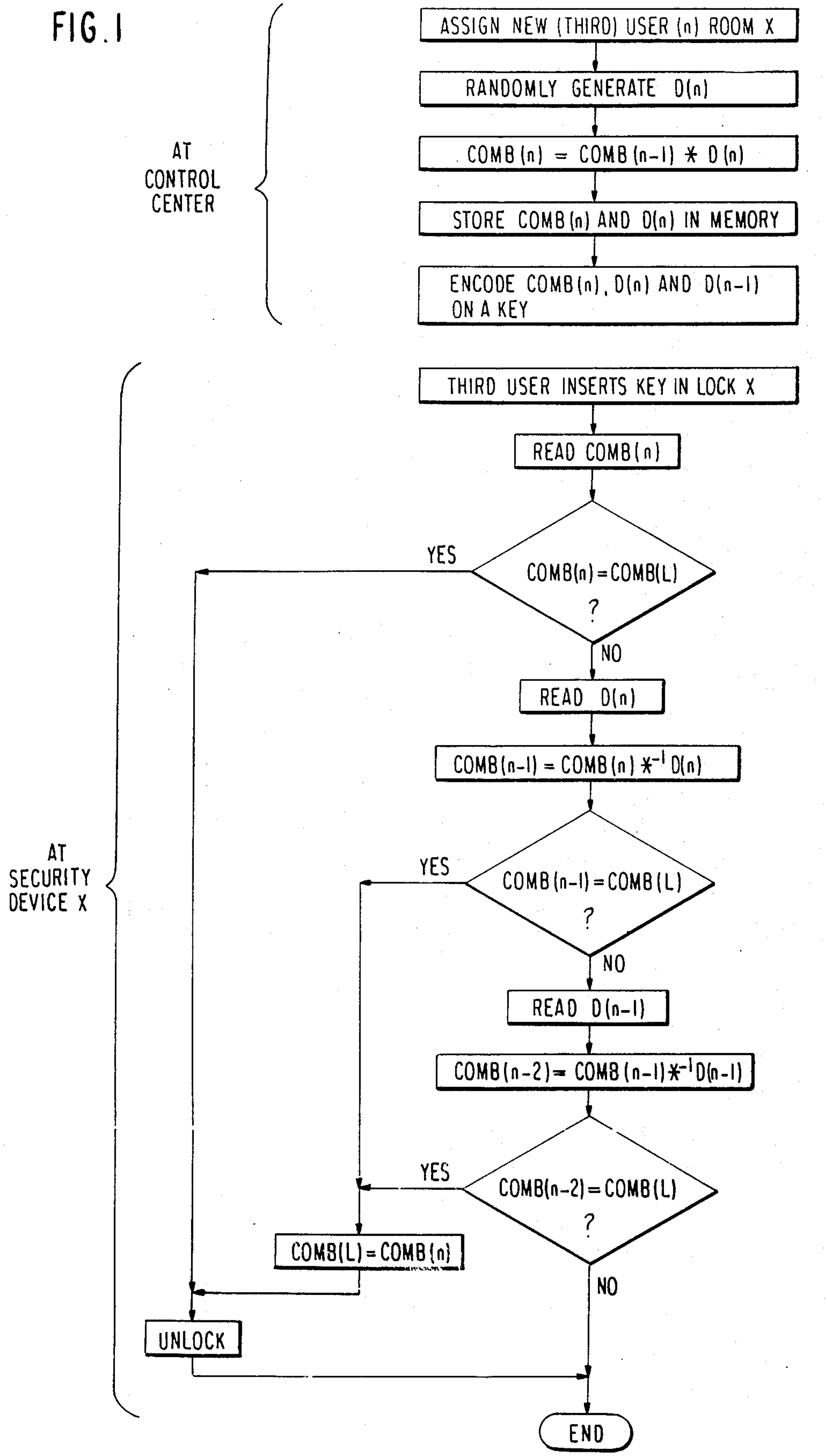
FIG. 1 is a flow chart of major steps in the operation of a security system according to the invention.

In this detailed description, like elements are given like reference numerals. In addition, the terms "first," "second" and "third" and "current""next" and "new next" have the same meaning as set forth in the Background of the Invention section.

Generally, the invention, nicknamed the "skip function", works by calculating multiple sequential combinations to a particular combination to a security device and comparing these combinations as well as the particular combination with a combination stored in the security device. By calculating multiple sequential combinations, even if a next key has been "skipped", a new next key will still open the security device.

As described in U.S. Pat. No. 4,396,914, each next combination to the security device is calculated by generating a number (a first calculation code), which is a random number in the preferred embodiment, and applying the code to a current combination using a predetermined algorithm to obtain the next combination. Application of the predetermined algorithm can be represented by the following equation:

$$COMB(m)=COMB(m-1)^{*}\,D(m),$$

where "*" represents the operation performed by the algorithm. COMB(m) represents the "mth" combination, COMB(m−1) represents the combination immediately preceding the "mth" combination and D(m) represents the calculation data, which when combined with a particular combination by applying the predetermined algorithm, results in the next successive combination. Subsequently, a new next combination can be calculated by generating a second calculation code and applying the second code to the next combination by using the predetermined algorithm.

In the present invention as hereinafter disclosed, the security device compares the combination on the key with the stored combination in the security device. The security device can also calculate combinations previous to the combination on the key and compare them with the stored combination. When the combination on the key or a calculated combination matches the stored combination, the security device is opened.

The previous combinations are calculated by using an algorithm which is inversely related to the predetermined algorithm. That is, the algorithm in the security device is related to the predetermined algorithm in the following manner:

$$f(COMB(m-1),\ D(m))=COMB(m), \text{ and}$$

$$g(COMB(m),\ D(m))=COMB(m-1),$$

where f (x, y) represents the predetermined algorithm being applied to a combination x and a calculation data y, and g (x, y) represents the algorithm at the security device being applied to a combination x and a calculation data y, COMB(m−1) is a combination and COMB(m) is the next successive combination to COMB(m−1), and D(m) is the calculation data which when applied to COMB(m−1) using the predetermined algorithm results in COMB(m). Hereinafter, algorithms related in the above-described manner will be referred to as inversely related and g (x, y) will be referred to as the inverse algorithm to f (x, y). (That is, the operations performed by the algorithms are inversely related.) Examples of inversely related algorithms (operations) are addition and subtraction, multiplication and division, and exponential and logarithmic functions. For some applications, not all inversely related algorithms will be practical. For example some algorithms may cause the combination to continue to grow beyond the maximum number of bits which it is reasonable to store on a key.

Examples of algorithms using operation which do not change the number of bits in a combination are an exclusive OR operation or a bit-inversion operation. The exclusive OR operation and bit-inversion operation also have the advantage that the inverse of the operation is the operation itself. This special property is shown by the following equations:

$$f(COMB(m-1),\ D(m))=COMB(m), \text{ and}$$

$$f(COMB(m),\ D(m))=COMB(m-1).$$

For example, if a first combination is a twelve bit number, e.g., 010011100101, and each bit is assigned a number zero through eleven starting with the least significant bit, the calculation data can be a four bit number (e.g. limited to values of eleven and less) whose value is equal to the bit to be inverted. Thus. for a calculation data of 0011, the predetermined algorithm would result in the number three bit being inverted and the second combination would be 010011101101. When the bit-inversion algorithm is again applied to the second combination and the second calculation data, the result is the first combination. Algorithms using operations possessing the above-described special property are a special class of inversely related algorithms and will be referred to as reversible algorithms. Included among the advantages of using a reversible algorithm is that the same operation can be used at the security device as at the control center to simplify the system.

Figure 2:
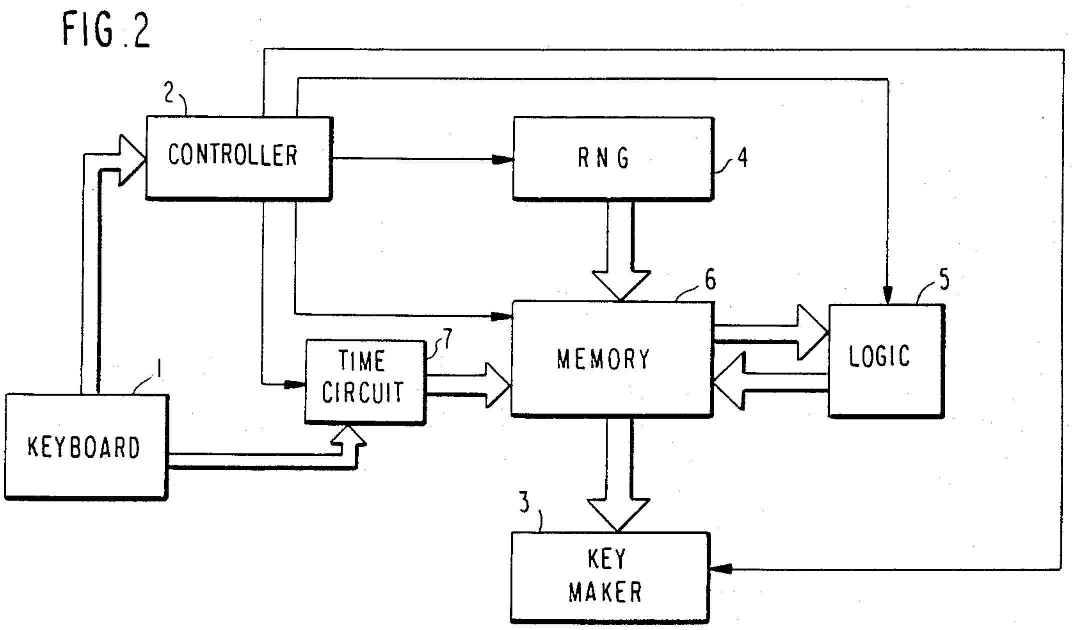
FIG. 2 is a block diagram of a control center in the security system according to the present invention.
Figure 3:
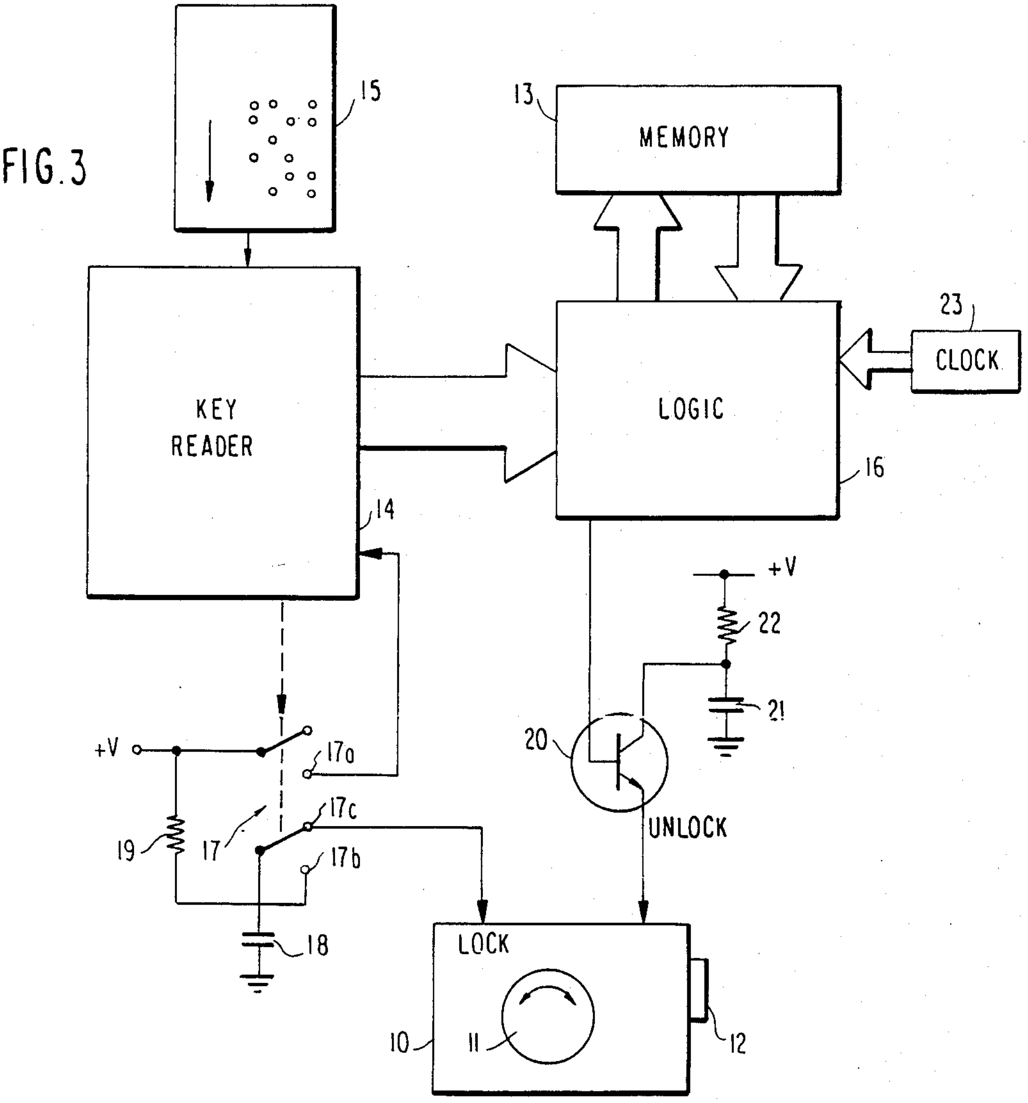
FIG. 3 is a block diagram of a particular security device in the security system according to the present invention.

Referring to FIGS. 1–3, the electronic security device according to the present invention includes a control center (FIG. 2) and a security device (FIG. 3). For example, the control center can be a computer at a hotel desk lobby and the security device can be a door lock of a hotel room.

FIG. 1 is a flow chart of the major steps in operating an electronic security system according to the present invention. At the control center, it is assumed that a first lock user and a second lock user have already been issued respective first and second keys with respective first and second combinations for the same particular security device in accordance with the above-described Aston system and the electronic security device described in U.S. Pat. No. 4,396,914, hereby incorporated by reference herein.

For each particular security device, a memory 6, e.g. a random access memory, in a computer or the like at the control center stores the combination COMB(n−1)

of the most recently issued key (in this case the second combination) and two calculation codes, for each room lock. The stored calculation codes are: (1) the calculation data D(n−1) (second calculation data) which was applied to the previous (first) combination by means of a predetermined algorithm to achieve the most recent (second) combination; and (2) the calculation data D(n−2) (first calculation code) which was applied to the combination previous to the first combination by means of the algorithm to achieve the first combination.

When a third lock user arrives at the control center and has been assigned the same room (e.g. a room X), the system works as follows. The operator, using a keyboard 1, selects room X, and presses appropriate buttons to cause a new key 15 for the lock at room X to be produced by a key maker 3. The operator can also input data relating to a time span during which the key 15 will be valid as will be described later. As shown in FIG. 4A, just prior to production of the key 15, the data stored in the memory 6 includes the second combination COMB(n−1), the second calculation data and the first calculation data. After the new (third) user is assigned the room X, a new calculation data D(n) is randomly generated, and a new (third) combination COMB(n) is calculated by applying the predetermined algorithm to the second combination COMB(n−1) and D(n).

As shown in FIG. 4B, the third combination COMB(n) and third calculation data D(n) are then stored in the memory 6 along with the second calculation data D(n−1). At this time, the second combination COMB(n−1) and first calculation data D(n−2) stored in the memory 6 can be purged from the memory in this embodiment of the invention. The third combination COMB(n), and the second and third calculation data D(n−1), D(n), respectively, are then stored on the key 15, as shown in FIG. 4C.

The third user then takes the key 15 to the room X and inserts the key in the lock. A key reader 14 in the lock reads the data on the key and supplies it to a lock logic circuit 16. The logic circuit 16 compares the combination stored on the key with a combination COMB(L) stored in the lock, and if there is a match, the lock is opened. However, in this case, the combination in the lock is equal to COMB(n−2), so there will not be a match. When there is no match, the logic circuit 16 calculates the second combination COMB(n−1) using the data stored on the key and compares it with the combination COMB(L) in the lock. The second combination COMB(n−1) is calculated by applying the third calculation data D(n) to the third combination COMB(n) using an algorithm which is inversely related to the predetermined algorithm, as represented by the following equation:

$$COMB(n-1)=D(n)^{*-1}COMB(n),$$

where "*−1" represents the inverse of the predetermined algorithm. In the special case where the predetermined algorithm is reversible, $*^{-1}$ equals *.

The lock logic circuit 16 next compares the calculated second combination with the stored combination COMB(L). If there is a match, the third combination replaces the stored combination and the lock is opened. If there is no match, the lock logic circuit calculates the first combination COMB(n−2) from the calculated second combination and the second calculation data D(n−1), read from the key, by applying the inverse algorithm, as represented by the following equation.

$$COMB(n-2)=COMB(n-1)^{*-1}D(n-1)$$

The resultant first combination is compared with the stored combination. If there is a match, the third combination replaces the stored combination, and the lock is opened.

The structure of the control center and security device for performing the above-described operations will now be described in more detail.

As noted above, when the new, third lock user arrives at the control center and has been assigned the same security device X. a key 15 is produced. To make the key 15, a controller 2 (e.g. a central processing unit) causes a random number generator (RNG) 4 to output the third calculation data, D(n) which is applied to COMB(n−1) at a logic circuit 5 to generate COMB(n). The logic circuit 5 applies the predetermined algorithm to its inputs. The circuit 5 can be formed, for example, by an arrangement of logic gates or the like as is well-known in the art.

The memory 6 is provided for storing the data shown in FIG. 4A before issuance of the third key, and the data in FIG. 4B after issuance of the third key, as described above. The key maker 3 is adapted to encode the data of FIG. 4B on a blank key to create the key 15. The key maker 3 can encode data on the key by using methods, such as magnetic or optical encoding, which are well known in the art. Other data can be provided on the key 15 for controlling the lock, such as lock-out function data described in U.S. Pat. No. 4,396,914.

The security device can be a door lock, having a knob or handle 11 used for withdrawing a bolt 12 of a lock mechanism 10. The lock mechanism 10 includes a clutch whereby the knob or handle 11 is mechanically coupled to the bolt 12 and the clutch is electromagnetically actuated for locking or unlocking the security device.

The electronic security device also includes a lock memory 13 for storing the current lock combination COMB(L), a key reader 14 for reading data from the key 15 and the logic circuit 16. The key reader 14 produces first, second and third sets of outputs, which correspond to the third combination COMB(n), the third calculation data D(n) and the second calculation data D(n−1), respectively. If the key 15 has data optically encoded thereon, the key reader 14 is an optical reader, and if the key has data magnetically encoded thereon the key reader is a magnetic reader, as is well known in the art.

A switch 17 is linked with the key reader so that fully inserting the key 15 into the key reader causes engagement of contacts 17*a* and 17*b* of the switch. Engagement of the contact 17*a* connects a power supply +V with the key reader to cause the key reader (i.e. the optical or magnetic reading mechanism) to read the data from the key and send it to the logic circuit 16. Engagement of the contact 17*b* connects the power supply, through a resistor 19, to a capacitor 18 to charge the capacitor. When the key 15 is withdrawn from the lock, the switch 17 will open so that a contact 17*c* is engaged and the capacitor 18 will discharge through a "LOCK" input of the lock mechanism 10. Thus, the mechanism will be re-locked in response to removal of the key.

To open the lock mechanism 10, the logic circuit 16 has an output which controls a transistor switch 20 for controlling the discharge of another capacitor 21. A resistor 22 provides a permanent charging path for the capacitor 21. When the output of the logic circuit 16 goes "high" the capacitor 21 discharges into the "UNLOCK" input of the mechanism 10.

In addition to the skip function, the present invention also includes a way of preventing a lock user from accessing a room prior to check-in time and subsequent to the user's check-out time. Generally, when user "n" is assigned room X, the operator at the control center also enters data relating to the user's time of use, at the keyboard 1. The data is transmitted to a time circuit 7 for determining a user check-in time $TIME_{IN}(n)$ and a user check-out time $TIME_{OUT}(n)$. The two times are encoded on the key 15, along with the third combination and the first and second calculation codes. When the key is inserted in the lock, the check-in time $TIME_{IN}(n)$ and the check-out time $TIME_{OUT}(n)$ are compared with a time TIME(L) kept in the lock by a clock 23. If the TIME(L) is not in between or equal to one of the two times $TIME_{IN}(n)$ and $TIME_{OUT}(n)$, the lock will not be opened regardless of the combination and codes on the key and the combination in the lock.

To perform this function, the time circuit 7 includes a clock 71, a microprocessor ($\mu$P) 72, and a RAM 73 (or any other type of memory for indefinitely storing values). The clock keeps track of real time by keeping a running total of elapsed time (e.g. in hours and minutes, or in days hours and minutes) from a predetermined initial time $t_0$ (e.g. 12:01 a.m. January 1). When the third user is assigned the room X, the operator enters the length of stay, e.g. in days to the microprocessor 72 via the keyboard 1. The RAM 73 stores the hotel's standard check-in time $st_1$ in hours (e.g. 15 hours represents 3 p.m.) and the hotel's standard check-out time $st_2$ in hours (e.g. 12 hours represents 12 p.m.). The microprocessor 72 receives the running time from the clock 71, the standard check-in and check-out times $st_1$ and $st_2$ from the RAM 73, and the length of stay from the keyboard 1, and calculates the user's check-in and check-out times $TIME_{IN}(n)$ and $TIME_{OUT}(n)$, respectively, according to a program such as that shown in FIG. 5A.

First, the microprocessor 72 determines the check-in time $TIME_{IN}(n)$ by converting the elapsed number of full days $DAYS_O(n)$ into hours $H_0(n)$, and then adding the standard check-in time $st_I$ in hours. Next, the check-out time $TIME_{OUT}(n)$ is determined by taking the number of full days as converted into hours $H_0(n)$, and adding the number of full days of the stay $DAYS_S(n)$ converted into hours $H_S(n)$ as well as the standard check-out time $st_2$ in hours. The user check-in and check-out times are then transmitted to the memory 6 and to the keymaker 3 for encoding on the key 15. The state of the memory 6 prior to arrival of the third user is shown in FIG. 4A; the state of the memory 6 upon issuance of the key 15 is shown in FIG. 4B; and the data encoded on the key 15 is shown in FIG. 4C.

Alternatively, the user check-in and check-out times could simply be transmitted from the time circuit 7 to the keymaker 3 without being stored in the memory 6.

The lock includes the following additional structure to determine whether or not the key is being used prior to the user check-in time or after the user check-out time. The key reader 14 is adapted to read the third user's check-in time $TIME_{IN}(n)$ and the check-out time $TIME_{OUT}(n)$ in addition to the third combination and the calculation codes. The logic circuit 16 is adapted to receive these five inputs from the key reader 14 (either all at once or as needed). Further, the clock 23 is provided in the lock for keeping a running total of hours TIME (L) from the above mentioned predetermined initial time, and transmitting the running total to the logic circuit 16.

Various other ways to determine the check-in and check-out times are evident from the above description, as well as various other apparatus.

Figure 6:
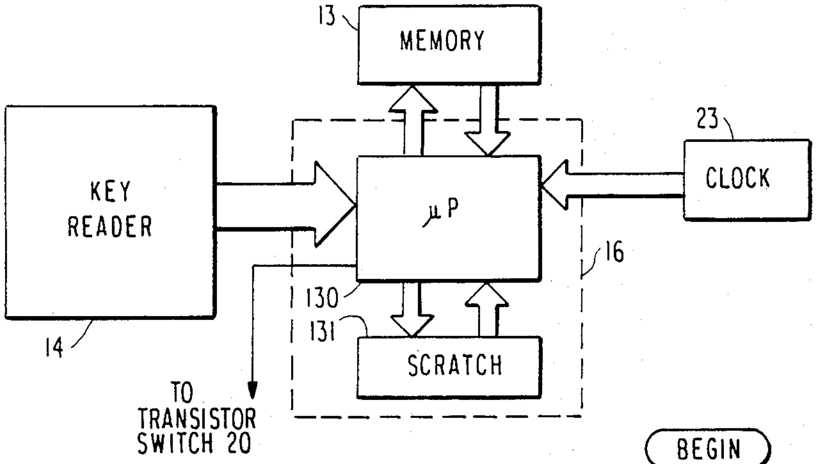
FIG. 6 is a schematic diagram of part of a security device shown in FIG. 3 according to the invention.

FIG. 6 shows an embodiment of the invention in which the logic circuit 16 in the security device of FIG. 3 includes a microprocessor ($\mu$P) 130 and a scratch pad memory (SCRATCH) 131. Except for the logic circuit 16, the other components of the security device of FIG. 3 are the same. Therefore, only the lock memory 13, key reader 14, counter 23 and logic circuit 16 are shown in FIG. 6.

The scratch pad memory 131 can be a RAM or any type of memory capable of storing a value therein and then being written over by a new value.

Figure 7:
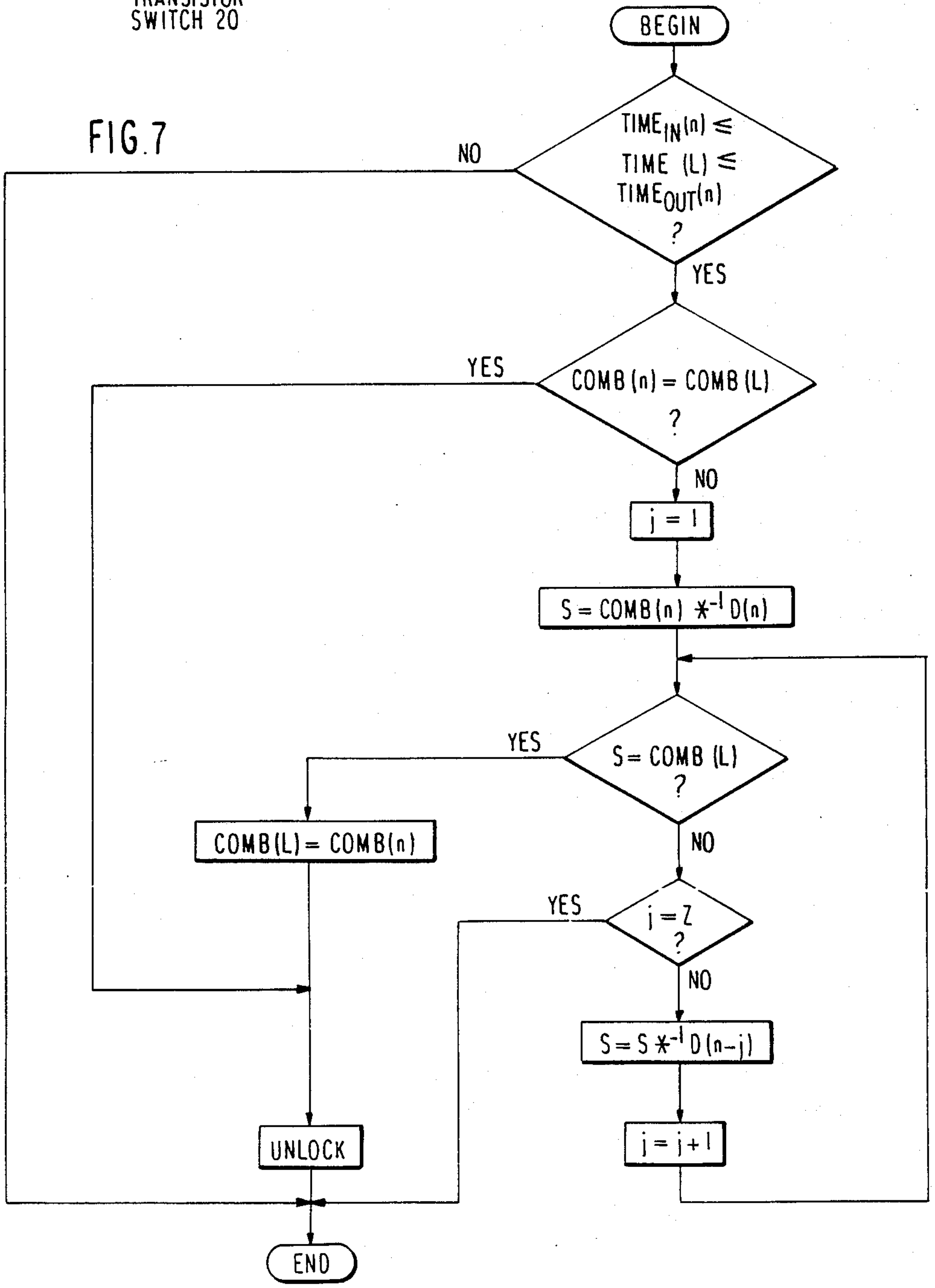
FIG. 7 is a flow chart showing the sequence of logical operations performed by the security device of FIG. 6 when a key is inserted therein.

The logic circuit 16 receives the five outputs from the key reader 14, the time TIME(L) in hours from the clock 23, and the combination stored in the lock memory 13, determines whether the key is valid at the present time, and carries out a series of comparisons and calculations in accordance with the description of FIG. 1, if the key is valid. In particular, FIG. 7 shows an example of a specific program that the microprocessor 130 carries out when the key 15 is inserted into the key reader 14. The microprocessor first asks whether the time TIME(L) in the lock is greater than or equal to the third user's check-in time $TIME_{IN}(n)$ on the key and less than or equal to the third user's check-out time $TIME_{OUT}(n)$ on the key. If these constraints are not met, the program ends and the lock cannot be opened by the key at the current time. If these constraints are met, the microprocessor next asks whether the combination COMB(n) on the key equals the stored lock combination COMB(L). If there is a match, the lock mechanism 10 is opened and the program ends. If there is no match, a variable "j" is defined as equal to one. In addition, "S", a value which is stored in the scratch pad memory 131, is set equal to COMB(n−1), which is calculated by performing the inverse algorithm on COMB(n) and D(n). If S equals COMB(L), COMB(L) is set equal to COMB(n) and the lock is opened. If S does not equal COMB(L) it is determined whether j equals Z, where "Z" equals the maximum number of combinations that COMB(n) can be "ahead of" COMB(L) in the sequence yet still open the lock. That is, Z equals the number of calculation codes stored on the key, which is a design choice.

If j equals Z, the key is invalid and the program ends without opening the lock. If j does not equal Z, S is set equal to COMB(n−j) (which is COMB(n−2)), as calculated by performing the inverse algorithm on S (which is COMB(n−1)) and D(n−j) (which is D(n−1) since j currently equals 1). Thereafter, j is incremented by 1. The microprocessor 130 will again ask if S equals COMB(L). If so, COMB(L) is set equal to COMB(n) and the lock is opened. If not, it is again determined whether j equals Z. The loop continues in this way until either S=COMB(L) or j=Z. In most instances, it is sufficient that Z=2, as usually no more than one key in the sequence will have been skipped. However, it is possible to store more than two consecutive calculation codes in the memory 6 at the control center, and to then store these codes on the key.

Alternatively, only the check-in time or only the check-out time could be stored on a key.

It should be noted that the microprocessor can check to see whether the time in the lock is in between, or equal to one of, the check-in and check-out times on the key, after all of the combinations have been calculated and compared with the lock combination, or at anytime during the program.

The lock mechanism of the above-described security device can be opened by the third user's key whether or not the second key was ever used, as long as the first key has been used. With the above construction, the security device operates as follows. Assuming that the first combination is COMB(n−2) and that the first user opens the lock, the combination stored in the lock at that time will become COMB(n−2). When the first user has checked out and a second user checks in, a second key, having COMB(n−1), D(n−1) and D(n−2) stored thereon, is issued. When the second key is inserted in the lock, the second combination COMB(n−1) will not equal the stored combination COMB(L) (which is currently COMB n−2)) when j=1 because S will equal COMB(n−2). Therefore, S is then set equal to COMB(n−2). Now, S equals the stored combination COMB(L). The lock will then store COMB(n−1) in the memory 13 in place of COMB(n−2), and the first key will no longer be able to open the lock.

In the case where the second key has been skipped (never used) and the third key has been issued, when the third key is inserted into the lock, COMB(n−2) which is stored in the lock will be compared with COMB(n) and there is no match. The variable j will be set equal to 1, and S will be set equal to COMB(n−1) by applying the inverse of the predetermined algorithm to COMB(n) and D(n). S will then be compared with COMB(n−2) stored in the lock and there will be no match. The variable j will be less than 2, so the loop will continue. S will then be set equal to COMB(n−2) by applying the inverse of the predetermined algorithm to COMB(n−1) and D(n−1). S will now equal COMB(L), and COMB(n) will then replace COMB(n−2) in the memory 13. The lock will be opened, and both the first and second keys will no longer open the lock.

The invention also allows a new hotel guest to have the convenience of registering early in the day and receiving a key at that time yet preventing the new guest from entering the room prior to the beginning of the new guest's stay (e.g. while the room is still occupied). It also has the advantage that when a guest's check-out time arrives, the guest can no longer gain access to the room. This feature is particularly advantageous where a new guest has not yet used the room, such that the combination in the lock is still the combination on the previous guest's key. Without this feature, the previous guest could still use the room, even after checking out.

From the foregoing description, it is evident that the present invention provides an electronic combination lock system including a plurality of electronic combination locks for which keys can be made at a central location and the combination can be randomly changed without electrical connections between the locks and the control center. In addition, even in the case where one or more successive combinations have been skipped, the lock can be opened and the combination stored on the key can replace the combination stored in the lock.

Thus, correspondence between the lock and the control center is maintained, without the considerable inconvenience of reprogramming the lock or reissuing the key which the control center considers to be the current key, i.e., the key immediately prior to the newly issued key.

In the above-mentioned embodiments, the determination by the lock of whether or not the key is valid in view of the check-in and/or check-out times stored thereon is performed before the determination of whether the combination stored on the key is valid. However, this order of determination can be reversed. An appropriate order of determination can be chosen to save unnecessary computation and power usage. Further, the system can be operated by storing on the key, and/or by using, only the combination and calculation data.

It should be understood that certain deviations from the above embodiments can be made without departing from the spirit and scope of the invention, and it is intended that all matter contained in the above description or shown in the accompanying drawings be interpreted as illustrative and not in a limiting sense, with respect to claims set forth below. In the claims, the meanings of the terms "first," "second and "third" are not necessarily limited to the meanings used in the rest of the specification.

We claim:

1. An electronic security device openable in response to a release signal, said device comprising:

(a) a key means having at least a first combination and first and second calculation data stored thereon;

(b) lock memory means for storing a lock combination;

(c) key reading means for receiving said key means, and for reading from said key means said first combination and said first and second calculation data; and (d) electronic logic means coupled to said lock memory means and said key reading means for:

(1) comparing said first combination read from said key means with said lock combination received from said lock memory means;

(2) calculating a second combination from said first combination and said first calculation data read from said key means, and comparing said second combination with said lock combination;

(3) calculating a third combination from said second combination calculated by said logic means and said second calculation data read from said key means, and comparing said third combination with said lock combination; and (4) generating said release signal in response to a match between said lock combination and one of said first, second and third combinations.

2. An electronic security device according to claim 1, wherein said logic means includes means for replacing said lock combination with said first combination when one of said second and third combinations matches said lock combination.

3. An electronic security device according to claim 1, wherein said logic means comprises a microprocessor and a scratch pad memory.

4. An electronic security device according to claim 1, wherein said logic means comprises three comparators.

5. An electronic security device according to claim 1, wherein said second combination is generated by said logic means only when said first combination does not match said lock combination.

6. An electronic security device according to claim 1, wherein said third combination is generated by said logic means only when said first and second combinations do not match said lock combination.

7. An electronic security device according to claim 1, wherein said first and second calculation data are random numbers.

8. An electronic security device according to claim 1, wherein said first, second and third combinations satisfy the following relationships:

$$C3*D2=C2$$

$$C2*D1=C1$$

and said logic circuit means calculates said second combination and said third combination according to the following relationships:

$$C1*^{-1}D1=C2$$

$$C2*^{-1}D2=C3$$

wherein C1, C2, C3 represent said first, second and third combinations, respectively, D1, D2 represent said first and second calculation data, respectively, * represents a first operation, and $*^{-1}$ represents a second operation which is inversely related to said first operation.

9. An electronic security device according to claim 8, wherein said first and second calculation data are random numbers.

10. An electronic security device according to claim 9, wherein said first and second algorithms comprise respective operations which correspond to each other.

11. An electronic security device according to claim 1, wherein said key means is adapted for also storing a predetermined time measured from an initial time, said key reading means is adapted for also reading said predetermined time from said key means, and said security device further comprises timer means for determining an elapsed time from said initial time, and means coupled to said key reading means and said timer means for inhibiting said release signal when said first predetermined time read from said key means is less than said elapsed time.

12. An electronic security device according to claim 1, wherein said key means is adapted for also storing first and second predetermined times measured from an initial time, said key reading means is adapted for also reading said predetermined times from said key means, and said security device further comprises timer means for determining an elapsed time from said initial time, and means coupled to said key reading means and said timer means for inhibiting said release signal when said elapsed time is one of less than said first predetermined time and greater than said second predetermined time read from said key means.

13. An electronic security system comprising:

(a) a control center including:
  (1) means for generating first and second calculation data;
  (2) means for generating first, second and third combinations, said second combination being generated by applying a predetermined algorithm to said first combination and said first calculation data, and said third combination being generated by applying said predetermined algorithm to said second combination and said second calculation data;
  (3) means for storing said third combination and said first and second calculation data on a key
(b) a security device openable in response to a release signal, said security device including:
  (1) memory means for storing a lock combination:
  (2) key reading means for reading said third combination and said first and second calculation data from said key; and
  (3) electronic logic means for:
    comparing said third combination with said lock combination;
    calculating said second combination from said third combination and said first calculation data, and comparing said second combination with said lock combination;
    calculating said first combination from said second combination and said second calculation data, and comparing said first combination with said lock combination: and
    generating said release signal in response to a match between said lock combination and one of said first, second and third combinations.

14. An electronic security device according to claim 13, wherein said logic means includes means for replacing said lock combination with said third combination when one of said first and second combinations matches said lock combination.

15. An electronic security device according to claim 13, wherein said logic means comprises a microprocessor and a scratch pad memory.

16. An electronic security device according to claim 13, wherein said logic means comprises three comparators.

17. An electronic security device according to claim 13, wherein said second combination is generated by said logic means only when said third combination does not match said lock combination.

18. An electronic security device according to claim 13, wherein said first combination is generated by said logic means only when said second and third combinations do not match said lock combination.

19. An electronic security device according to claim 13, wherein said means for generating said first and second calculation data is adapted for randomly generating said first and second calculation data.

20. An electronic security device according to claim 13, wherein said logic circuit means calculates said second combination by applying another algorithm to said third combination and said second calculation data, and calculates said first combination by applying said another algorithm to said second combination and said first calculation data, and wherein said another algorithm is inversely related to said predetermined algorithm.

21. An electronic security device according to claim 20, wherein said means for generating said second and third calculation data is adapted for randomly generating said first and second calculation data.

22. An electronic security device according to claim 17 wherein said predetermined algorithm and said another algorithm comprise respective operations which correspond to each other.

23. A security system according to claim 13, wherein said control center further includes means for determining a predetermined time from an initial time, said key means is adapted for also storing said first predetermined time thereon, and said security device further comprises means for determining an elapsed time from said initial time, and means for inhibiting said release signal when said first predetermined time is less than said elapsed time.

24. A security system according to claim 13, wherein said control center further includes means for determining first and second predetermined times from an initial time, said key means is adapted for also storing said first and second predetermined times thereon, and said security device further comprises means for determining an elapsed time from said initial time, and means for inhibiting said release signal when said elapsed time is one of less than said first predetermined time and greater than said second predetermined time.

25. A method of operating an electronic security device having a lock combination stored in said device, said method comprising the steps of:

generating first calculation data;

storing said first calculation code and determining. from said first calculation data and a first combination, a second combination;

generating second calculation data:

storing said second calculation code and determining. from said second calculation data and said second combination, a third combination:

comparing said third combination with said lock combination;

calculating said second combination from said third combination and said second calculation data, and comparing said second combination with said lock combination;

calculating said first combination from said second combination and said first calculation data, and comparing said first combination with said lock combination; and unlocking said security device in response to a match between said lock combination and one of said first, second and third combinations.

26. A method according to claim 25, wherein said method further comprises a step for replacing said lock combination with said third combination when one of said first and second combinations matches said lock combination.

27. A method according to claim 25, wherein said second combination is calculated only when said third combination does not match said lock combination.

28. A method according to claim 25, wherein said first combination is calculated only when neither of said second and third combinations match said lock combination.

29. A method according to claim 25, wherein said first and second calculation data are randomly generated.

30. A method according to claim 25, wherein in said step of determining said second combination, said second combination is determined according to the following equation:

$$C1*D1=C2$$

wherein in said step of determining said third combination, said third combination is determined according to the following equation:

$$C2*D2=C3$$

wherein in said step of calculating said first combination, said first combination is calculated according to the following equation:

$$C2*^{-1}D1=C1,$$

and wherein C1, C2, C3 represent said first, second and third combinations, respectively, D1, D2 represent said first and second calculation data, respectively, * represents a first operation, and $*^{-1}$ represents a second operation which is inversely related to said first operation.

31. A method according to claim 30, wherein said first and second calculation data are randomly generated.

32. A method according to claim 31, wherein said first and second algorithms comprise respective first and second operations which correspond to each other.

33. A method according to claim 25, wherein said method further comprises the steps of: determining a predetermined time from an initial time, and measuring an elapsed time from said initial time, wherein said step of opening said security device is only performed when said predetermined time is greater than or equal to said elapsed time.

34. A method according to claim 25, wherein said method further comprises the steps of: determining first and second predetermined times from an initial time, and measuring an elapsed time from said initial time, wherein said step of opening said security device is only performed when said elapsed time is greater than or equal to said first predetermined time and less than or equal to said second predetermined time.

35. An electronic security system comprising:

a control center including:

first means for determining a first combination;

second means for determining first and second predetermined times measured from an initial time; and key making means connected to said first and second determining means for storing said first combination and said first and second predetermined times on a key, and a security device, openable in response to a release signal, including:

reading means for reading said first combination and said first and second predetermined times from said key;

memory means for storing a second combination;

means for determining an elapsed time from said initial time;

circuit means connected to said memory means, said reading means and said means for determining and including means for comparing said first combination read from said key with said second combination obtained from said memory means and said elapsed time obtained from said means for determining with said first and second predetermined times read from said key, and means for issuing said release signal when said first and second combinations correspond and said elapsed time is greater than or equal to said first predetermined time and less than or equal to said second predetermined time, said means for issuing being non-responsive when said elapsed time is less than said first predetermined time and greater than said second predetermined time even if said first and second combinations are correspond.

36. In an electrically programmable security system of the type wherein the lock is reprogrammed by inserting into the lock a key having information thereon relating to the old combination and a new combination, the improvement comprising, means for adding to said key information relating to the combination of said lock prior to said old combination, and means in said lock for calculating, from information on said key, said old combination and said prior combination.

37. An electronically programmable security system as claimed in claim 36, wherein the information on said key comprises a new combination, a new randomly generated calculation data and an old randomly generated calculation data, and wherein said means for adding comprises a control center including:

means for storing an old combination assigned to said lock and an old randomly generated calculation data, means for randomly generating a new randomly generated calculation data, and means, receiving said old combination from said means for storing and said new randomly generated calculation data from said means for randomly generating, for operating on said old combination and said new randomly generated calculation data in accordance with a predetermined control algorithm to generate a new combination, wherein said means for storing is adapted for also storing said new combination and said new randomly generated calculation data.

38. An electronically programmable security system as claimed in claim 37, wherein said means at said lock for calculating comprises:

means for storing a stored combination, means for receiving said key, and for reading the information, from said key, means, connected to said means for storing and said means for reading, for carrying out the following computations and logic sequence:

(1) comparing said new combination read from said key with said stored combination received from said means for storing and opening said lock if there is a match, (2) if there is no match in said first step (1), operating on said new combination and said new calculation data according to a predetermined lock algorithm to generate said old combination, comparing said old combination with said stored combination and opening said lock if there is a match, said control and lock algorithms being the inverse of one another, (3) if there is no match in said second step (2), operating on said old combination generated in said second step (2) and said old calculation data read from said key according to said predetermined lock algorithm to generate said prior combination, comparing said prior combination with said stored combination and opening said lock if there is a match.

39. An electronically programmable security system as claimed in claim 38, wherein said control and lock algorithms comprise respective control and lock operations which correspond to a single operation.

40. An electronically programmable security system as claimed in claim 39, wherein said operation is a bit inversion operation.

41. An electronically programmable security system as claimed in claim 40, wherein said operation is an exclusive - 0R operation.

* * * * *